United States Patent [19]

Nohmi

[11] Patent Number: 4,594,593
[45] Date of Patent: Jun. 10, 1986

[54] SYNTHETIC APERTURE RADAR IMAGE PROCESSING SYSTEM

[75] Inventor: Hitoshi Nohmi, Tokyo, Japan

[73] Assignee: Nippon Electric Co., Ltd., Tokyo, Japan

[21] Appl. No.: 454,139

[22] Filed: Dec. 28, 1982

[30] Foreign Application Priority Data

Dec. 28, 1981 [JP] Japan .................................. 56-210343
Dec. 28, 1981 [JP] Japan .................................. 56-210344

[51] Int. Cl.⁴ .............................................. G01S 13/90
[52] U.S. Cl. ................................................. 343/5 CM
[58] Field of Search ............. 343/5 CM, 378; 364/728

[56] References Cited

U.S. PATENT DOCUMENTS

| | | | |
|---|---|---|---|
| 3,976,998 | 8/1976 | Voles et al. | 343/5 CM |
| 4,034,370 | 7/1977 | Mims | 343/5 CM |
| 4,045,795 | 8/1977 | Fletcher et al. | 343/5 CM |
| 4,132,989 | 1/1979 | Arens | 343/5 CM |
| 4,163,231 | 7/1979 | Zuerndorfer et al. | 343/5 CM |
| 4,219,811 | 8/1980 | Herman et al. | 343/5 CM |
| 4,292,634 | 9/1981 | Wu et al. | 343/5 CM |
| 4,471,357 | 9/1984 | Wu et al. | 343/5 CM |

OTHER PUBLICATIONS

J. C. Kirk, Jr., "A Discussion of Digital Processing in Synthetic Aperture Radar", IEEE Trans., vol. AES-11, No. 3, May '75, pp. 326–337.

Bonfield et al, "Synthetic-Aperture-Radar Real-Time Processing", IEE Proc., vol. 127, Pt. F., No. 2, Apr. '80, pp. 155–162.

Herland, "Some SAR-Processing Results Using Auto-Focusing", Proc. 3rd SEASAT-SAR Workshop on SAR Imagery Quality, Frascati, Italy, 11–12, DEC. 1980.

Primary Examiner—Thomas H. Tarcza
Assistant Examiner—Gilberto Barrón, Jr.
Attorney, Agent, or Firm—Sughrue, Mion, Zinn, Macpeak & Seas

[57] ABSTRACT

In an SAR image processing system of the type wherein an image is reproduced from received data, the reproduced image is obtained on the basis of range compression, range curvature compensation and azimuth compression, the correlation coefficient between two look image signals is determined for each of predetermined relative shift amounts, the relative shift amount $K_{max}$ giving the maximum correlation coefficient is determined, and an azimuth reference function and range curvature compensation function are generated based on the shift amount K.

16 Claims, 7 Drawing Figures

SYNTHETIC APERTURE RADAR IMAGE PROCESSING SYSTEM

FIELD OF THE INVENTION

This invention relates to a synthetic aperture radar (SAR) system and, more particularly, to an auto-focusing image processing system for synthetic aperture radar data which can rapidly reproduce well-focused and high-quality images through digital processing in an automated manner.

BACKGROUND OF THE INVENTION

There is known widely a synthetic aperture radar wherein a radio beam is emitted at a constant pulse repetition frequency obliquely directing to a ground from a side-looking radar on board a platform such as an artificial satellite or aircraft, and then time-serial SAR data in the form of an echo signal from the ground is subjected to synthetic processing, whereby range resolution and azimuth resolution comparable to those attained by a large aperture antenna can be achieved effectively using a small aperture antenna. For example, refer to the following papers; JOHN C. KIRK, JR., "A Discussion of Digital Processing in Synthetic Aperture Radar," IEEE TRANSACTIONS OF AEROSPACE AND ELECTRONIC SYSTEMS, VOL. AES-11, NO. 3, MAY 1975, pp. 326-337, and D. J. Bonfield, B. Sc., and J. R. E. Thomas, M. Sc., "Synthetic-aperture-radar real-time processing", IEE PROC., VOL. 127, Pt. F, No. 2, April 1980, pp. 155-162.

As synthetic processing techniques to obtain images from the SAR data, an optical processing technique was typically used conventionally. But, in order to avoid the problem of limitation in mechanical accuracy, stability, etc. of an optical system, there have been recently developed many techniques which can reproduce high-quality images through the digital processing of SAR data.

In SAR, the carrier frequency of the respective pulses transmitted from an SAR antenna undergo linear frequency modulation for the purpose of enlarging a searchable range and increasing range resolution. Therefore, an echo signal (SAR data) for the transmitted pulse signal is made to spread over in the range direction. The echo signal also spreads over in the azimuth direction resulting from the movement of the platform. Time-serial SAR data comprises echoes from the nearest ground to the farthest ground with respect to the platform. The SAR data is sampled at a predetermined rate which is determined by a frequency band width of the transmitted pulse after pulse compression, thereby to produce data in the range direction. This data in the range direction is obtained sequentially for each emission of the transmitted pulse, namely, in the form of data in the azimuth direction. The SAR data thus obtained is stored into a memory in the form of a matrix as range line data for each azimuth direction. The image processing of SAR data is to compress the foregoing received SAR data spreading in both directions and to reproduce the data as well-focused images. Such compression is carried out through two cross-correlating processes. One process is the correlation processing between a conjugate function signal of the transmitted signal and the SAR signal to compress the SAR data in the range direction (range compression). In general, the pulse compression is performed using dispersed delay lines with a frequency modulation characteristic (that is, frequency versus time delay characteristic) opposite to that of the transmitted pulse. The other process is the correlation processing to compress the SAR data in the azimuth direction (azimuth compression). This azimuth compression is performed for each echo signal from each range bin region on the ground through the cross correlating between each echo signal obtained after the range compression and an azimuth reference signal which is determined based on parameters such as the platform's speed, altitude and attitude, and the speed of the target due to rotation of the earth on its axis. Before the azimuth compression processing, there is carried out a range curvature compensation processing to compensate the variation of the range bin including an echo signal from the given target in the azimuth direction (range migration) resulting from a distance variation between the platform and the given target on the ground during the movement of the platform through a very large effective aperture length.

Basically, the foregoing processings must be carried out with high accuracy in order to obtain high quality SAR images. High range resolution is achieved by the range compression through the cross-relating process using a conjugate signal of the transmitted pulse signal. Accordingly, the possibility of obtaining the reproduced images of high quality is dependent on determining the optimum signals for the range curvature compensation and the azimuth reference function.

Heretofore, the determination of those signals has been performed based on the measured parameters such as the speed, altitude and attitude of the moving platform by using sensors on the platform or measuring instruments installed on the ground. Consequently, it is has been difficult to obtain such parameters with high accuracy. Moreover, a large-scale tracking system on the ground has been required for acquisition of the parameters which requires a lot of time.

On the other hand, E. A. Herland has proposed a technique to obtain the optimum azimuth reference function signal directly from the SAR data in a digital manner, in place of the acquisition of the parameters through the complicated processes as mentioned above. Reference is made to a paper by E. A. Herland entitled SOME SAR-PROCESSING RESULTS USING AUTO-FOCUSING", Proceedings of the 3rd SEA-SAT-SAR Workshop on "SAR Image Quality" held at Frascati, Italy, 11-12, December 1980, (ESASP-172), pp. 19-22. In this proposed technique, the contrasts of the image data picked out in an appropriate range area are measured while varying the speed parameter in a predetermined region, and then both range curvature compensation and azimuth compression are performed based on the speed parameter which makes the contrast maximum. However, since this technique requires the reproduction of images in order to attain the maximum contrast of the picked-out image data for each of the speed parameter values one by one, the number of arithmetic operations is significantly increased with the difficulty reproducing the well-focused, high-quality images rapidly.

SUMMARY OF THE INVENTION

It is an object of the invention to provide an SAR image processing system which permits auto-focusing and is capable of reproducing the well-focused images at all times with a simple arrangement.

Another object of the invention is to provide an SAR image processing system capable of attaining the well-focused and high-quality images in a short processing time.

According to the invention, there is provided an SAR image processing system wherein an image is reproduced from the received SAR data through range compression, range curvature compensation and azimuth compression using a range reference function, a range curvature compensation function and an azimuth reference function, respectively. The system comprises; means for developing correlation coefficient between the predetermined two look image signals which are obtained by dividing the azimuth-compressed signal into predetermined plural looks for each predetermined relative shift amount, means for selecting and generating the relative shift amount $K_{max}$ giving the maximum correlation coefficient, and azimuth reference function generating means for generating said azimuth reference function based on the relative shift amount $K_{max}$. There is also provided an SAR image processing system comprising means for generating the range curvature compensation function which is determined in accordance with the image shift amount K. Further, there can be obtained an SAR image processing system comprising means for developing a variance value of the azimuth-compressed signal for each Doppler frequency variation rate which is varied in a predetermined range, and means for setting initial values for the range curvature compensation signal and the azimuth reference function signal based on the value of the Doppler frequency variation rate giving the maximum variance value.

Other objects and features of the present invention will be apparent upon reading the following description with reference to the accompanying drawings.

DESCRIPTION OF THE PREFERRED EMBODIMENTS

Figure 1:
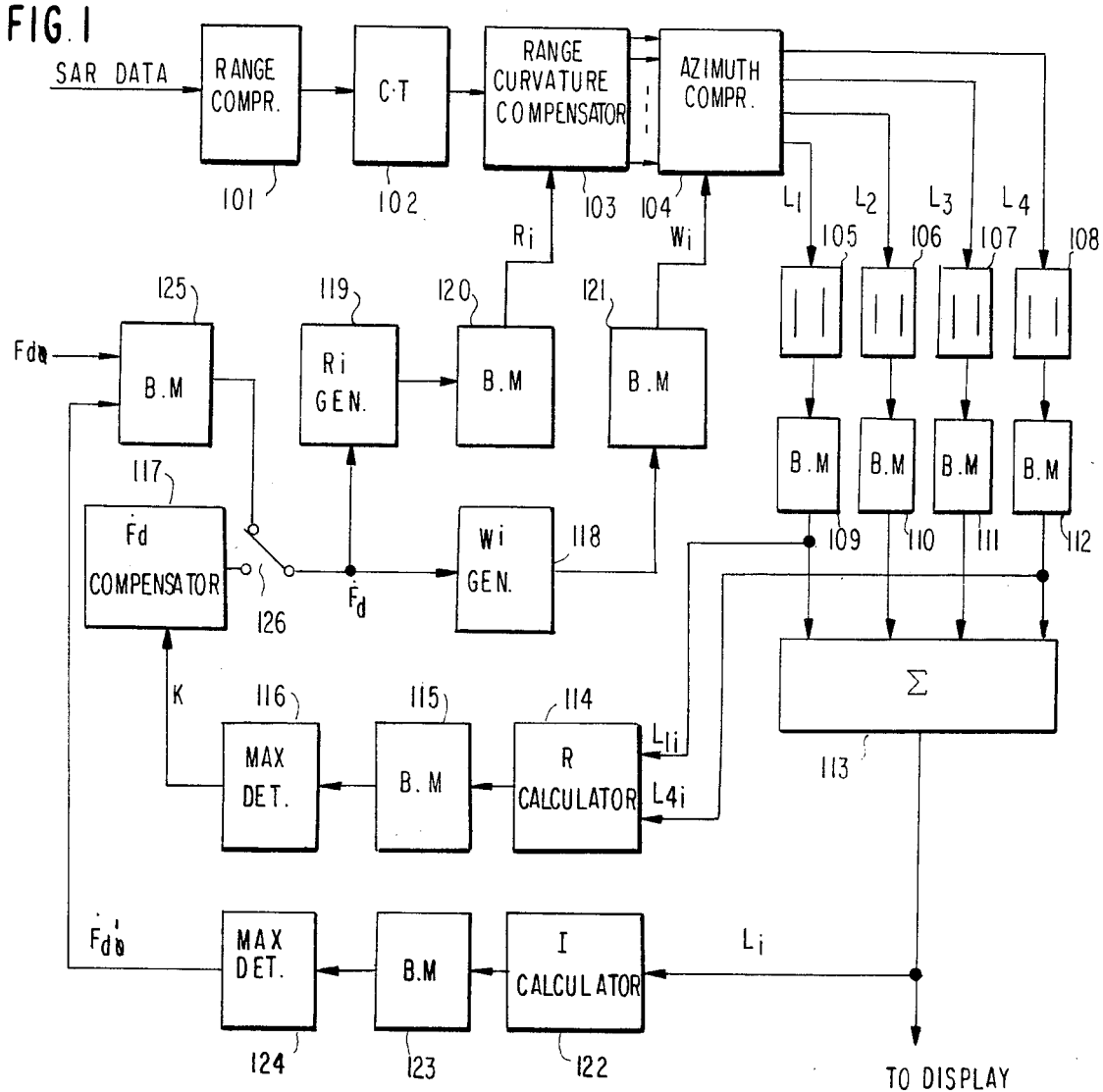
FIG. 1 is a block diagram of one embodiment of the present invention.

FIG. 1 illustrates a block diagram of the one embodiment of the invention. As previously noted, the SAR image processing system is basically composed of: a range compression circuit 101 adapted to compress the SAR data in the range direction; a corner turning circuit 102 adapted for taking out signals from the same region on the ground in response to a plurality of the transmitted pulses for the purpose of the azimuth compression in the next step; a range curvature compensation circuit 103 for compensating the range migration; and an azimuth compression circuit 104 adapted to perform the azimuth compression using the echo signal the range migration of which have been compensated in the circuit 103. It should be noted that, not only in the foregoing processings but also the description hereinafter, the SAR data is divided into a real component (I) and a quadrature component (Q) so as to hold amplitude and phase information, and that the SAR data is treated as complex number data and complex signal processing is performed in each of the processings unless otherwise noted.

Figure 2:
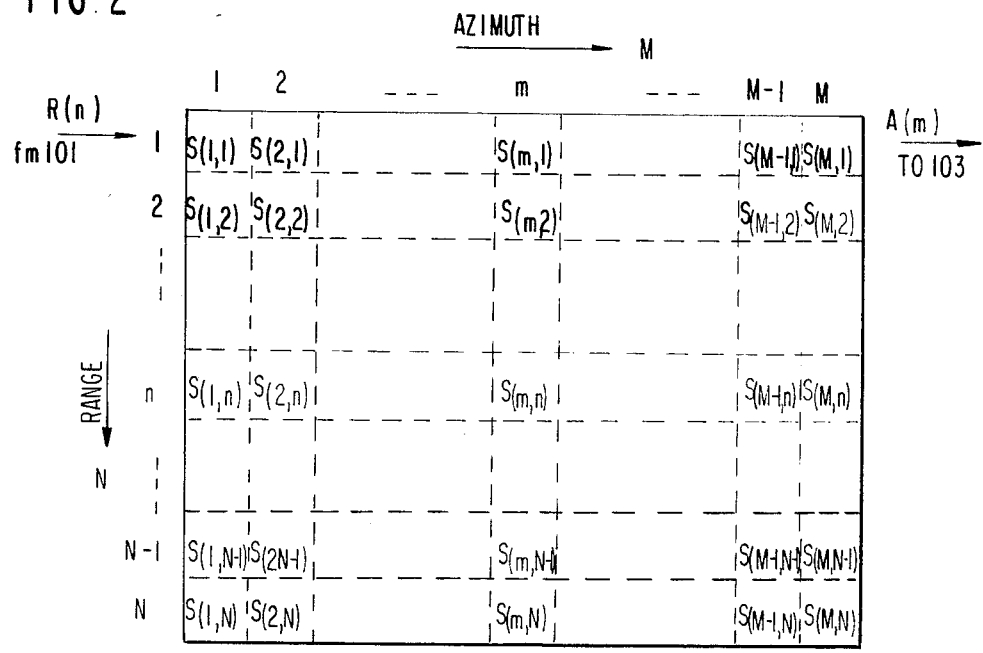
FIG. 2 is a diagram of the stored state of SAR data in a memory shown in FIG. 1 the system.

As is well known, the range compression circuit 101 is composed of a correlator to correlate the echo signal with a conjugate function signal of the transmitted pulse signal. An input signal to the compression circuit 101 comprises digital SAR data which is obtained by sampling the received signals at a predetermined period. Each of the sampled data represents the echo signal from the region corresponding to the range bin. Now let the total number of range bins be N and the number of azimuthal directions to be taken into account be M. The number of azimuthal directions is represented by the number of transmitted pulses sent out during the movement of the platform through the effective aperture length of the SAR. The SAR data $S_{(m,n)}$ (where m denotes the azimuthal direction number and n denotes the number designating the range bin) is inputted time-serially as follows and then stored in a memory as shown in FIG. 2:

$S_{(1,1)}, S_{(1,2)}, \ldots S_{(1,N)}, S_{(2,1)}, S_{(2,2)}, \ldots S_{(2,N)}, \ldots,$
$S_{(M,1)}, S_{(M,2)}, \ldots, S_{(M,N)}$ The corner turning circuit 102 takes out time-serially the SAR data of each range bin in the azimuth direction. This function can be simply achieved through the appropriate address designation for the data stored as shown in FIG. 2. Output data from the corner turning circuit 102 is represented as follows:

$S_{(1,1)}, S_{(2,1)}, \ldots, S_{(M,1)}, S_{(1,2)}, S_{(2,2)}, \ldots, S_{(M,2)}, \ldots$
$\ldots, S_{(1,N)}, S_{(2,N)}, \ldots, S_{(M,N)}$ In FIG. 2, a signal R(n) denotes the echo signal of the n-th range bin, while a signal A(m) denotes the echo signal of the m-th azimuthal direction obtained from the respective range bins through the above corner turning.

As stated hereinbefore, the echo signal from the given target is not located in the same bin because of the range migration. Therefore, it is necessary to take out the echo signals from the same target at all times from among the input data for the azimuth compression. This processing is performed through the range curvature compensation circuit 103.

As is generally known, a change in distance $\Delta R(t)$ between the platform and a given point target on the ground at a time t is given by the following equation (1):

$$R(t) = \frac{\lambda}{2} \int_{T_1}^{t} F_d(\tau) \, d\tau \quad (T_1 \leq t \leq T_2) \quad (1)$$

where $T_1$ and $T_2$ denote the starting time and the terminating time of irradiation by the transmitted beam to the given point target, $F_d(\tau)$: the Doppler frequency shift of the echo signal from the given point target, and $\lambda$: a carrier wavelength.

Then, taking into account the movement of the satellite or the like, the variation of the Doppler frequency variation rate $F_d$ can be assumed to be linear and hence the Doppler frequency shift $F_d(\tau)$ is represented by:

$$F_d(\tau) = F_{dc} + \dot{F}_d t \qquad (2)$$

where $F_{dc}$ denotes the Doppler frequency of the echo signal obtained from the central point of the transmitted beam. Thus, the equation (1) turns to the following equation (3):

$$R(t) = \frac{\lambda}{2}\left(\frac{\dot{F}_d}{2} t^2 + F_{dc} \cdot t\right) \qquad (3)$$

The range curvature compensation signal is determined based on $\Delta R$. Since $F_{dc}$ can be assumed to be substantially constant, the range curvature compensation signal serves as a functional factor depending on the Doppler frequency variation rate $\dot{F}_d$ and $F_{dc}$ only. As a result, accurate setting of $\dot{F}_d$ is the key to the range curvature compensation and hence the reproduction of high-quality images.

The azimuth compression circuit 104 carries out the azimuth compression by correlating the output from the range curvature compensation circuit 103 with the azimuth reference function which is also a function of $\dot{F}_d$ and is represented by $$\exp\left(-j2\pi \cdot \frac{\dot{F}_d}{2} t^2\right) \qquad (2)$$

where $T_1 \leq t \leq T_2$.

The foregoing respective processings have been already well known and many concrete implementations have been proposed. For example, a correlator using charge coupled devices (CCD) can be employed for both the range compression and the azimuth compression, while the corner turning can be carried out through a circuit using a shift register or a random access memory (RAM). These particular implementations are disclosed in detail in the above-mentioned references and in U.S. Pat. No. 4,132,982.

As stated above, for accurate range curvature compensation and azimuth compression, it is necessary to know a change in distance between the platform and the given point target on the ground with high accuracy. In the conventional system, this purpose has been served by on-board sensors of not so high-accuracy, tracking radars of large scale on the ground, and the like. Thus, errors were apt to occur with the result that the reproduced images of high-quality could not be obtained easily.

According to the present invention, as fully described hereinafter, the azimuthal-compressed data is divided into a plurality of look components. The correlation values between two look image signals selected from among the look components are developed for the respective relative shift amounts. Then, the Doppler frequency variation rate $\dot{F}_d$ is determined based on a relative shift amount $K_{max}$ (i.e., image shift) giving the maximum correlation value. The relative shift amount represents the shift amount or displacement between the two look images to be correlated. The range curvature compensation function signal and the azimuthal reference function signal are determined based on $\dot{F}_d$ developed from the relative shift amount $K_{max}$ giving the maximum correlation value, thereby permitting the optimum focusing at all times. Furthermore, initial values for those range curvature compensation function signal and azimuth reference function signal are set in such a manner that an intensity value I of the azimuth-compressed data is computed for each value of $\dot{F}_d$ varying in a predetermined range and then the initial values are determined based on the Doppler frequency variation rate giving the maximum I. This achieves a system with a higher converging speed, a significantly reduced number of arithmetic operations and a rapid acquisition time of the reproduced images. Those processes according to the invention will be described more concretely hereinafter.

Figure 3:
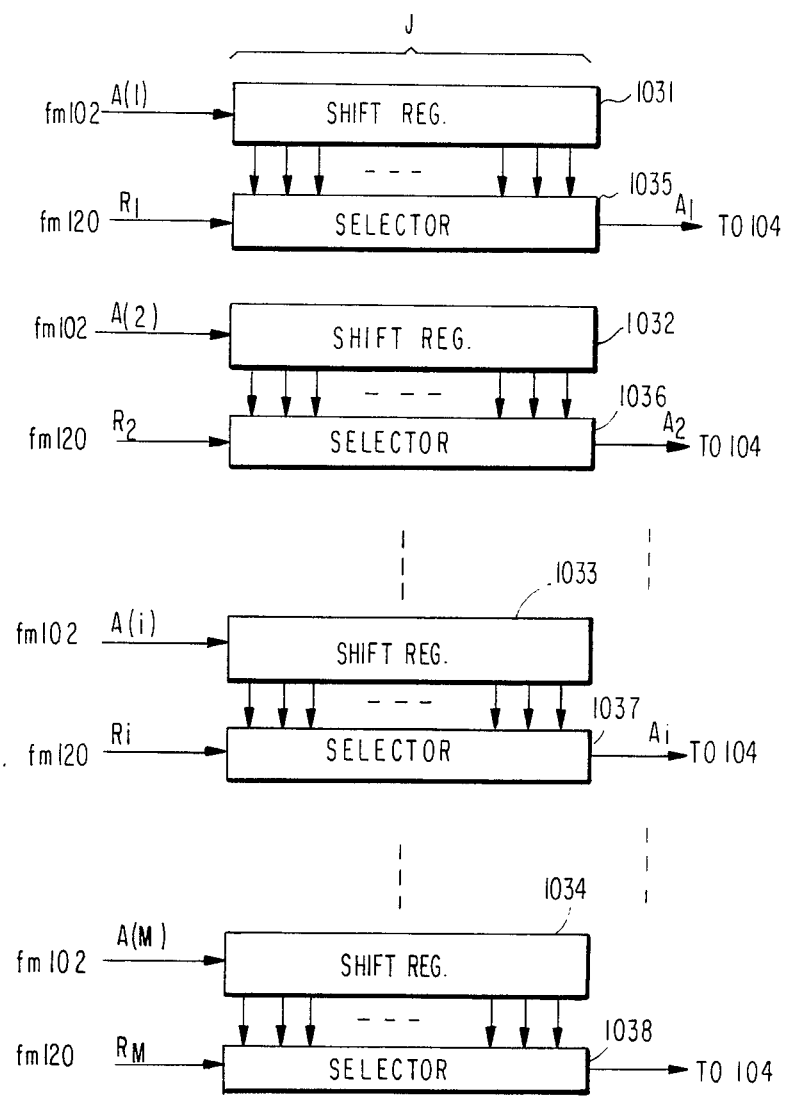
FIG. 3 is a diagram of one example of a range curvature compensation circuit shown in FIG. 1.

The range curvature compensation circuit 103 comprises, as shown in FIG. 3, M shift registers 1031 to 1034 each having J stages. Range-compressed signals $A(1)$, $A(2)$, $A(i)$, and $A(M)$ of the 1st, the 2nd, the i-th, and the M-th azimuthal directions for the 1st to the J-th range bins are time-serially given to the 1st shift register 1031, the 2nd shift register 1032, the i-th register 1033, and the M-th register 1034, respectively. The stage number J of each shift register should be set at a value slightly larger than the maximum value of the above-mentioned range migration, and this value can be predicted in advance. Data stored in the respective stages of the shift registers 1031 to 1034 are supplied in parallel to selectors 1035 to 1038, respectively. The selectors 1035, 1036, ..., 1037, ..., 1038 selectively output signals from the stages corresponding to the range bins which are designated by compensation signals $R_1, R_2, \ldots, R_i, \ldots R_M$ supplied from a buffer memory 120 storing therein a range curvature compensation signal R. For details of the range curvature compensation circuit 103, reference is made to U.S. Pat. No. 4,132,989.

In the normal type SAR, the transmitted beam is divided into a plurality of beams (looks), the respective looks are subjected to compression processing independently, and then those looks are added to gain the reproduced image, whereby a reduction of the so-called speckle noise is effected. Division of the beam means that an area of the ground under irradiation of the beam is divided into a plurality of regions in the direction perpendicular to the traveling direction of the platform, and therefore signals from those divided regions on the ground have different center Doppler frequencies from one another. This indicates that there can be obtained separate multi-look signals by passing the azimuth-compressed signals through filters each having a given bandwidth and a center frequency predetermined for each look region. This arrangement is generally known and, for example, described in detail in U.S. Pat. No. 4,292,634.

Figure 4:
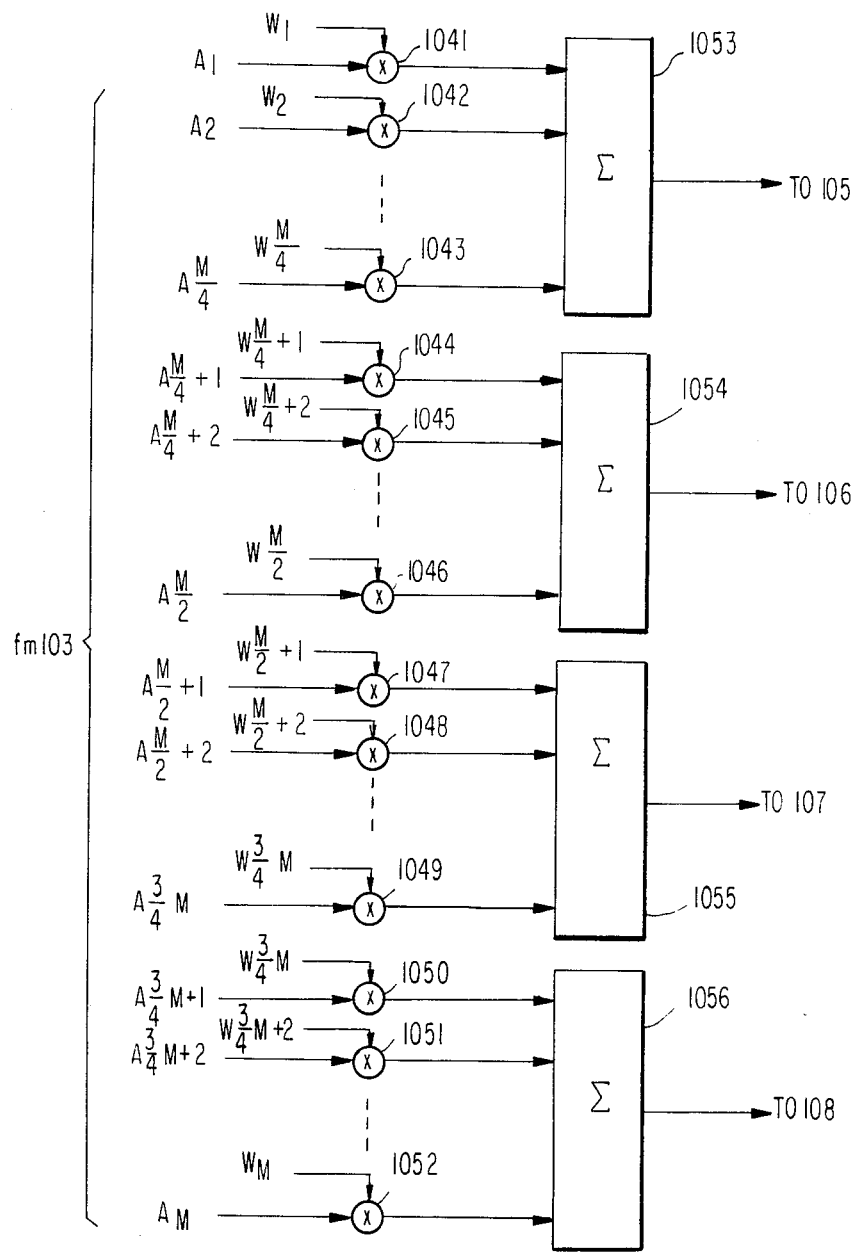
FIG. 4 is a diagram of one example of an azimuth compression circuit shown in FIG. 1.

Such multi-look processing is basically performed by providing a filter corresponding to the frequency characteristic of each look. In the present invention, the number of looks to be divided is selected at 4 and the signals after azimuth compression are divided into four groups in the azimuth direction. More specifically, when outputs from the range curvature compensation circuit 103 are assumed to be $A_1, A_2, \ldots, A_i, \ldots, A_M$ in accordance with respective azimuths i as shown in FIG. 3, the signal $A_i$ is multiplied by a factor $W_i$ which is determined depending on the azimuth reference function (and which is supplied from a buffer memory 121), through multipliers 1041 to 1052, thereby to carry out the azimuth compression, as shown in FIG. 4. At this time, the signals $A_1$ to $A_M$ are divided into four groups;

$A_1$ to $A_{M/4}$, $A_{(M/4)+1}$ to $A_{M/2}$, $A_{(M/2)+1}$ to $A_{3M/4}$, and $A_{(3M/4)+1}$ to $A_M$, and then the data obtained through the azimuth compression for each divided group are added by adders 1053 to 1056. In this way, there can be obtained the range- and azimuth-compressed signal for each of 4 looks.

Through the above-mentioned processing, an image of the target located in the region on the ground corresponding to the respective range bins in one azimuthal direction is sequentially reproduced. In other words, the image of N pixels in the range direction which come under irradiation of one transmitted pulse is reproduced. Then, when the echo signals in the range direction for the next transmission pulse are attained, the image of the next N pixels in the range direction are reproduced. Thereafter, the similar operation is repeated to reproduce the image continuously.

From each of the four adders 1053 to 1056 the signal compressed in the azimuth direction for each look as stated previously is generated for each pixel. The absolute values of the complex pixel signals for the respective looks are obtained by absolute value circuits 105 to 108 based on the equation of $\sqrt{(\text{real component})^2 + (\text{imaginary component})^2}$. The absolute values are stored in buffer circuits 109 to 112, respectively. The buffer circuits 109 to 112 convert the time-serial data in the range direction from the azimuth compression circuit 104 into the time-serial data in the azimuth direction. Hence, each of he circuits 109 to 112 can be made by using the same configuration as that of the corner turning circuit 102.

Outputs from the respective buffer circuits 109 to 112 are superimposed in an adder 113 to reduce the speckle noise and to improve the S/N ratio. The output of the adder 113 is fed to a display unit (not shown).

Two signals among the four look processing output signals that is, the signals in the azimuth direction read out from the buffer circuits 109 to 112, are provided to a correlation coefficient calculator 114.

Figure 5A:
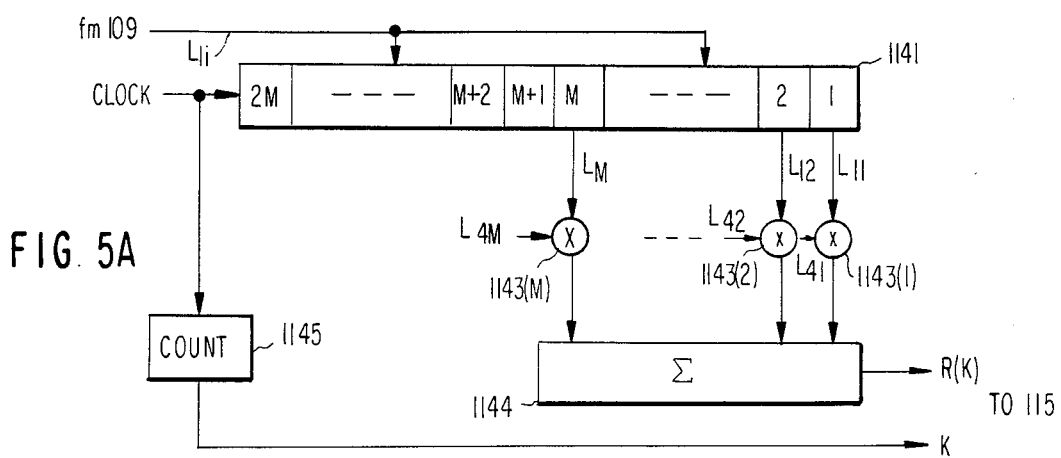
FIG. 5A is a diagram of one example of a correlation coefficient computing circuit shown in FIG. 1.
Figure 5B:
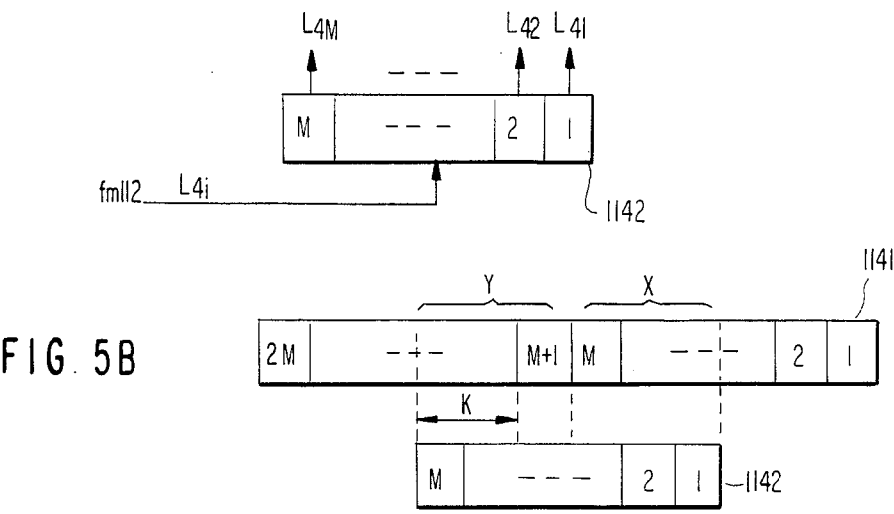
FIG. 5B is a diagram for describing the concept of the correlation processing.

Suitable configuration for the correlation coefficient calculator 114 is illustrated in FIG. 5A. The 1st and 4th look outputs $L_{1i}$ and $L_{4i}$ are read out from the buffer circuits 109 and 112. $L_{1i}$ and $L_{4i}$ denote the compressed signals in the azimuth direction i corresponding to a certain range bin for the 1st and 4th looks, respectively. $L_{1i}$ (i=1 to M) read out from the buffer circuit 109 is supplied to a shift register 1141 having (2M) stages. More specifically, $L_{11}$ is written into the 1st and (M+1)th stages of the shift register 1141, $L_{12}$ into the 2nd and (M+2)th stages thereof, and then $L_{1M}$ into the M-th and 2M-th stages thereof. In the shift register 1141, the contents stored in the respective stages are shifted sequentially rightward by predetermined clock signals. On the other hand, the 4th look output $L_{4i}$ from the buffer circuit 112 is fed to the shift register 1142 having M stages in such a manner that $L_{41}, L_{42}, \ldots L_{4M}$ are respectively written into the 1st, 2nd, ... M-th stages thereof. A counter 1145 counts the number of clock signals and then outputs the counted result as the relative shift amount (corresponding to an image shift) K. Outputs $L_{41}, L_{42}, \ldots, L_{4M}$ from the respective stages of the shift register 1142 are supplied to multipliers 1143(1), 1143(2), ..., 1143(M) which are in turn connected to the respective outputs of the 1st to M-th stages of the shift register 1141. When no clock signal is supplied to the shift register 1141, i.e., under the initial state of the register 1141, outputs from the M multipliers are added by an adder 1144 and then output therefrom as a correlation value R(0) at a relative shift amount of 0(K=0). Next, when one clock signal is supplied to the shift register 1141, the contents stored in the respective stages of the shift register 1141 are shifted to the right by one position. In this state, a correlation value R(1) at a relative amount of 1 is obtained through the same processing as that in the above. Thereafter, correlation values R(K) at a relative shift amount K (K=2 to M) are obtained sequentially in a similar manner until the number of input clock pulses reaches M. The correlation value R(K) is represented by the following equation (5) based on the 1st and 4th look outputs $L_{1i}$, $L_{4i}$.

$$R(K) = \sum_{i=0}^{M-K-1} L_{4i} \cdot L_{1i,(i+K)} + \sum_{i=M-K}^{M-1} L_{1i} \cdot L_{4i,(i-M+K-1)} \quad (5)$$

where $L_{1i,(i+K)}$ denotes the output of the (i+K)-th stage of the shift register 1141. FIG. 5B illustrates conceptually the correlation processing between the contents stored in the respective stages of both shift registers 1141 and 1142. The first term of the equation (5) represents the correlation in the X portion of FIG. 5B, while the second term represents the correlation in the Y portion thereof.

The correlation coefficient value R(K) at a relative shift amount of K thus obtained by the correlation coefficient calculator 114 is stored in a buffer memory 115. A maximum value detecting circuit 116 detects the relative shift amount $K_{max}$ giving the maximum correlation coefficient value among the data stored in the buffer memory 115 and then supplies $K_{max}$ to a Doppler frequency variation rate ($\dot{F}_d$) compensator 117.

The relative shift amount $K_{max}$ at the maximum value of R(K) represents an image shift between both look images. Accordingly, the absence of image shift corresponds to the state where the correlation factor R(0) assumes the maximum value. Image shift will be caused by improper setting of the range curvature compensation signal and the azimuth compression reference function signal. In the present invention, both the range bin selection signal in the range curvature compensation circuit and the azimuth reference function signal are determined based on the relative shift amount (image shift) $K_{max}$, and the thus determined signals are used to again carry out the range curvature compensation and the azimuth compression. Such a processing is repeated through a feedback loop until the image shift (relative shift amount $K_{max}$) becomes 0.

Figure 6:
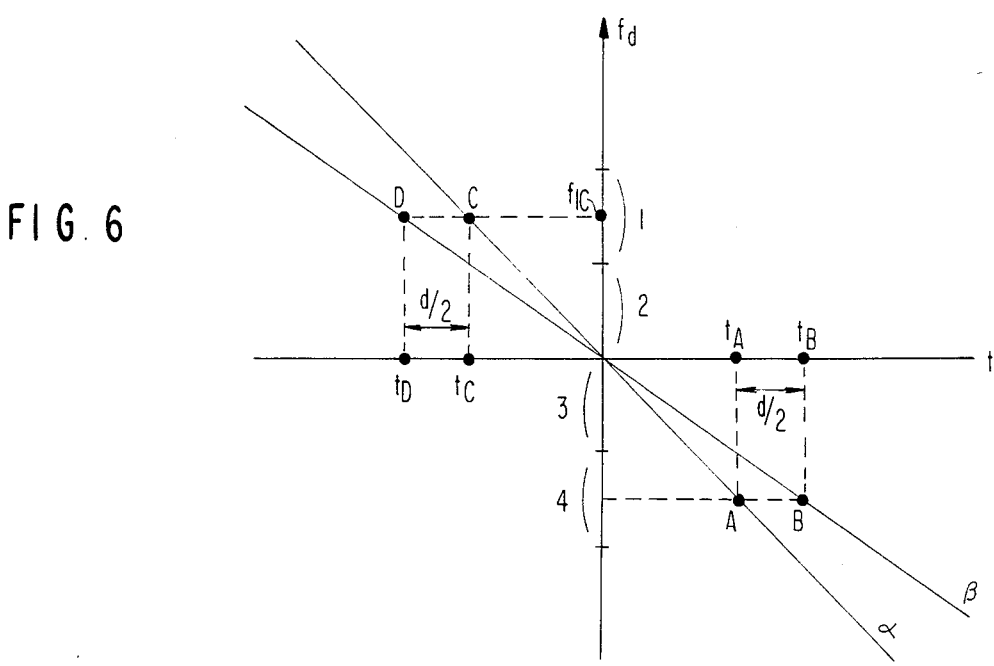
FIG. 6 is a graph of the relationship of an image shift and a variation rate of the Doppler frequency between looks.

The relationship between the image shift K and the azimuth reference function will be described hereinafter. FIG. 6 shows a relationship of Doppler frequency $f_d$ v. time of the received signal from a point target on the ground. It is assumed that t is 0 when the platform traveling along a circular orbit is positioned just beside the above point target. In the drawing, $\alpha$ is a linear line whose inclination represents the Doppler frequency variation rate $\dot{F}_{dR}$ of the actually received signal, while $\beta$ is a linear line whose inclination represents the Doppler frequency variation rate $\dot{F}_d$ used for the range curvature compensation and the azimuth compression. Sections ①, ②, ③ and ④ along the ordinate axis represent the regions which are obtained by dividing a variation range of the Doppler frequency of the received signal into four sections (i.e., into 4-look divisions). Now assuming that the difference between the center frequency $f_{1c}$ of the 1st look ① and the center frequency $f_{4c}$ of the 4th look ④ is $\Delta L$, the relation of $\Delta L = 2f_{4c}$ is obtained. Moreover, times $t_A$ and $t_B$ at points A and B at which a horizontal dot line passing through $f_{4c}$ intersects with the linear lines of $\beta$ and $\alpha$, respectively, indicate the time point where an image appears through the processing based on $\dot{F}_{dR}$ and the time point where an image appears through the current image processing based on $\dot{F}_d$ used therefor. The difference (assumed to be d/2) between both time points $t_A$ and $t_B$ causes a shift on the reproduced image. Similarly, the difference (equal to d/2) between the time points $t_C$ and $t_D$ corresponding to points C and D at which a horizontal line passing through $f_{1c}$ intersects with the linear lines of $\alpha$ and $\beta$, respectively, also causes a shift on the reproduced image. As a result, a shift between images (i.e., image shift) $\Delta K$ in the 1st and 4th looks is given by d which equal to $(|t_A - t_B| + |t_C - t_D|)$. From the geometrical calculation in FIG. 6, $$\frac{d}{2} = \frac{f_{4C}}{\dot{F}_d} - \frac{f_{4C}}{\dot{F}_{dR}} \quad (6)$$

Thus, the following equation is obtained by substituting $\Delta L = 2f_{4C}$ into the equation (6):

$$d = \frac{\Delta L}{\dot{F}_d} - \frac{\Delta L}{\dot{F}_{dR}} \quad (7)$$

Therefore, if the image shift d between both looks is given, the actual Doppler frequency variation rate $\dot{F}_{dR}$ can be expressed by the equation (8) as follows:

$$\dot{F}_{dR} = \frac{\dot{F}_d \cdot \Delta L}{\Delta L - \dot{F}_d \cdot d} \quad (8)$$

Further, a compensation amount $\Delta F_{dR}$ of the Doppler frequency variation rate can be expressed as follows:

$$\Delta \dot{F}_{dR} = \frac{\dot{F}_d \cdot d}{\Delta L - \dot{F}_d \cdot d}$$

The image shift d in the above equations corresponds to the relative amount shift $K_{max}$ when the aforesaid correlation coefficient R(K) is the maximum value, so that it is possible to attain the well-focused reproduced images by newly setting the Doppler frequency variation rate $\dot{F}_d$ based on the equation (8) in accordance with the resulting relative shift amount $K_{max}$. However, since the determination of the range curvature compensation signal and the azimuth reference function signal based on improper setting of $\dot{F}_d$ causes obscured images and makes it difficult to gain the accurate relative shift amount $K_{max}$, it is impossible to obtain the accurate Doppler frequency variation rate $\dot{F}_d$ immediately from the equation (8). In practice, therefore, an approximate value of $\dot{F}_d$ is first selected using the resulting relative shift amount $K_{max}$ to perform more accurate focusing, and then the next $\dot{F}_d$ is set from the subsequently resulting relative shift amount $K_{max}$ perform still more accurate focusing. This processing is repeated until the well-focused state is fully achieved. As is apparent from the equation (8), a larger value of $\Delta L$ is preferable from the standpoint of accuracy, so it is preferred to select two looks which are spaced at the largest distance from each other.

As mentioned above, the image shift between the looks results from improper setting of the range curvature compensation signal and the azimuth reference function signal, and these signals can be assumed to be functions depending on the Doppler frequency variation rate $\dot{F}_d$ only. Thus, according to the present invention, the Doppler frequency variation rate is newly set based on the equation (8) corresponding to the value of the relative shift amount (image shift) $K_{max}$.

More specifically, the Doppler frequency variation rate ($\dot{F}_d$) compensator 117 outputs the Doppler frequency variation rate $\dot{F}_d$ to be newly set to an azimuth reference function signal generator 118 and a range curvature comsation signal generator 119 based on the equation (8) corresponding to the relative shift amount $K_{max}$ which is obtained from the maximum value detecting circuit 116. The azimuth reference function generator 118 determines the azimuth reference function using the aforesaid equation (4) in response to $\dot{F}_d$, and then stores a factor $W_i$ for each azimuth direction i into the buffer memory 121. In the buffer memory 121 there is stored the determined factor $W_i$ for the azimuth compression, and the respective factors $W_1, W_2, \ldots, W_M$ used in the azimuth compression circuit shown in FIG. 4 are produced to the multipliers 1041, 1042, ..., 1052. Based on the $\dot{F}_d$ value newly sent out from the $\dot{F}_d$ compensator 117, the range curvature compensation signal generator 119 generates a range curvature compensation signal (i.e., range bin selection signal) $R_i$ in accordance with the equation (3) and then stores it into the buffer memory 120 in a similar manner. The compensation signal $R_i$ from the buffer memory 120 is supplied to the selectors 1035 to 1038 shown in FIG. 3, and the range curvature compensation is performed therein.

The foregoing compensation processings for $\dot{F}_d$ will be repeated until the image shift between the selected two looks becomes 0. Such processing is carried out sequentially for each portion properly sampled from the desired SAR images.

The setting of initial values for the range curvature compensation signal and the azimuth reference function signal is very important for rapid acquisition of the high-quality images because improper setting of initial values for the respective signals results in the increase of converging time necessary for reproducing the well-focused images. This is due to the fact that the accurate relative shift amount $K_{max}$ is difficult to obtain in such a case, and a lot of processing time is required since the number of processing points usually reaches several thousand in both range and azimuth directions.

According to the present invention, there is also provided a system for rapid acquisition of the high-quality reproduced images. The approximate Doppler frequency variation rate $\dot{F}_{d0}$ is first preset based on parameters such as speed, attitude and attitude of the platform. The intensity of the signal of the look output or the signal obtained by adding look outputs is attained through the determination of the variance value for each Doppler frequency variation rate varying in a predetermined range about $\dot{F}_{d0}$, and the Doppler frequency variation rate giving maximum variance value is set as the new initial value. Thereafter, the above-mentioned auto-focusing processing according to the present invention is carried out repeatedly while finely adjusting the Doppler frequency variation rate based on the resulting relative shift amount (image shift) $K_{max}$.

More specifically, as shown in FIG. 1, the intensity is computed by an intensity I calculating circuit 122 using one of the outputs from the absolute value circuits 105 to 108 or a synthetic (i.e., superimposed) output signal of two or more outputs. In this embodiment, assuming that the output signal of the adder 113 is $L_i(=L_{1i}+L_{2i}+L_{3i}+L_{4i})$, the intensity calculating circuit 122 computes the intensity I which is defined by the variance value, using the following equation (10):

$$I = \frac{\sqrt{\sum_{i=1}^{M} (L_i - \bar{L}_i)^2}}{\bar{L}_i} \quad (10)$$

where $L_i$ is an amplitude value of the respective data $L_i$ and $\bar{L}_i$ is the mean value of M data $L_1$ to $L_M$. The larger the intensity becomes, the stronger the contrast becomes. More concretely, the intensity calculating circuit 122 obtains a value of the intensity I for each Doppler frequency variation rate and then stores the intensity I into a buffer memory 123 with a value of a corresponding Doppler frequency variation rate. A maximum value detecting circuit 124 detects the maximum value of intensities being stored in the buffer memory 123, and selects the corresponding Doppler frequency variation rate $\dot{F}_{d0}$ as the best value at that time to send it to a buffer memory 125. The buffer memory 125 sends out an initial setting signal $\dot{F}_{d0}$ to the $R_1$ generator 119 and the $W_i$ generator 118 in its initial state, but after receiving $\dot{F}_{d0}$ from the maximum value detecting circuit 124, the buffer memory 125 supplies $\dot{F}_{d0}$ to both signal generators 118 and 119. These signal generators 118 and 119 generate the range curvature compensation signal and the azimuth reference function signal based on the supplied Doppler frequency variation rate, respectively, as previously stated. Subsequent to the foregoing processing, the output of the $\dot{F}_d$ compensator 117 is fed to both signal generators 118 and 119 upon changing-over of a switch 126, and then the above-mentioned auto-focusing is performed.

In the above description, processing for the range compression and azimuth compression is possible not only in the time domain but also in the frequency domain. As is generally known, the arithmetic processing speed can be significantly increased in the latter processing.

What is claimed is:

1. An SAR image processing system wherein an image is reproduced from received SAR data through range compression, range curvature compensation and azimuth compression using a range reference function, a range curvature compensation function and an azimuth reference function, respectively, comprising:

means for developing a correlation coefficient between two look image signals which are obtained by dividing an azimuth-compressed signal into plural looks for each of predetermined relative shift amounts between said two look image signals;

means for selecting and generating a relative shift amount $K_{max}$ giving the maximum correlation coefficient from among the developed correlation coefficients;

azimuth reference function generating means for generating said azimuth reference function based on said shift amount $K_{max}$; and range curvature compensation function generating means for generating said range curvature compensation function based on said relative shift amount $K_{max}$.

2. An SAR image processing system according to claim 1, wherein said azimuth reference function generating means comprises means for generating said azimuth reference function based on a Doppler frequency variation rate which is determined by said shift amount $K_{max}$.

3. An SAR image processing system according to claim 1, wherein said range curvature compensation signal generating means comprises means for generating said range curvature compensation signal based on the Doppler frequency variation rate which is determined by said shift amount $K_{max}$.

4. An SAR image processing system according to claim 1, wherein said two look image signals are in the form of an amplitude value.

5. An SAR image processing system according to claim 1, wherein said range and azimuth compression processing are performed in a frequency domain.

6. An SAR image processing system according to claim 1, wherein the number of said plural looks is 4.

7. An SAR image processing system according to claim 1, wherein said two look image signals have respective Doppler center frequencies spaced from each other at the largest distance.

8. An SAR image processing system wherein an image is reproduced from received SAR data through range compression, range curvature compensation and azimuth-compression using a range reference function, a range curvature compensation function and an azimuth reference function, respectively, comprising:

means for developing a variance value of said azimuth-compressed signal for each Doppler frequency variation rate which is varied in a predetermined range;

means for setting initial values for said range curvature compensation signal and said azimuth reference function signal based on the value of said Doppler frequency variation rate giving the maximum variance value;

means for developing the correlation coefficient between the predetermined two look image signals which are obtained by diving an azimuth-compressed signal into plural looks for each of predetermined relative shift amounts;

means for selecting and generating the relative shift amount $K_{max}$ giving the maximum correlation coefficient;

azimuth reference function generating means for generating said azimuth reference function based on said relative shift amount $K_{max}$; and range curvature compensation function generating means for generating said range curvature compensation function based on said relative shift amount $K_{max}$.

9. An SAR image processing system of the type including range curvature compensating means for compensating the range curvature of received SAR data in accordance with a range curvature compensation function and azimuth compression means for compressing said SAR data in the azimuth direction to obtain azimuthal compressed data in accordance with an azimuth reference function, said system comprising:

means for dividing said azimuthal compressed data into a plurality of look components;

means for generating a correlation coefficient between two of said look components for various relative shift amounts relative to one another;

means for determining a relative shift amount $K_{max}$ between said two look components which results in a maximum value for said correlation coefficient; and function generating means for generating at least one of said range curvature compensation function and said azimuth reference function in accordance with said relative shift amount $K_{max}$.

10. An SAR image processing system according to claim 9, wherein said function generating means comprises range curvature compensation function generating means for generating said range curvature compensation function in accordance with said relative shift amount $K_{max}$.

11. An SAR image processing system according to claim 9, wherein said function generating means comprises azimuth reference function generating means for generating said azimuth reference function in accordance with said relative shift amount $K_{max}$.

12. An SAR image processing system according to claim 10, wherein said function generating means further comprises azimuth reference function generating means for generating said azimuth reference function in accordance with said relative shift amount $K_{max}$.

13. An SAR image processing system according to claim 9, wherein said function generating means comprises Doppler compensation means responsive to said determined relative shift amount $K_{max}$ for generating a Doppler compensation signal corresponding to a Doppler frequency variation rate of said received SAR data signals.

14. An SAR image processing system according to claim 9, wherein said plurality of look components have different respective Doppler center frequencies, and said two look components have Doppler center frequencies which differ by the greatest amount among said plurality of look components.

15. An SAR image processing system according to claim 9, further comprising means for determining the intensity of a signal comprising at least one of said plurality of look components over a range of values for a predetermined system parameter.

16. An SAR image processing system according to claim 9, wherein said function generating means comprises parameter generating means for generating a first parameter having a value in accordance with said relative shift amount $K_{max}$, and means for generating said at least one function in accordance with said first parameter, said system further comprising:

means for determining the intensities of a signal including at least one of said plurality of look components over a range of values of said first parameter;

means for generating an initial value of said first parameter corresponding to the maximum intensity value determined; and means for selectively applying to said means for generating said at least one function either said initial value or the output of said parameter generating means.

* * * * *